United States Patent [19]

Fennel

[11] Patent Number: 4,739,484
[45] Date of Patent: Apr. 19, 1988

[54] METHOD AND DEVICE FOR CONTROLLING THE BRAKING VARIATION IN VEHICULAR BRAKES WITH BRAKE SLIP CONTROL

[75] Inventor: Helmut Fennel, Frankfurt am Main, Fed. Rep. of Germany

[73] Assignee: ITT Industries, Inc., New York, N.Y.

[21] Appl. No.: 31,145

[22] Filed: Mar. 25, 1987

Related U.S. Application Data

[63] Continuation of Ser. No. 590,954, Mar. 19, 1984, abandoned.

[30] Foreign Application Priority Data

Mar. 23, 1983 [DE] Fed. Rep. of Germany ....... 3310443

[51] Int. Cl.$^4$ ............................................. B60T 8/32
[52] U.S. Cl. .................................. 364/426; 303/103; 361/238
[58] Field of Search .................... 364/426, 565, 566; 180/197; 361/238; 303/95, 103, 105, 108, 110

[56] References Cited

U.S. PATENT DOCUMENTS

| | | | |
|---|---|---|---|
| Re. 31,383 | 9/1983 | Leiber et al. | 364/426 |
| 3,637,264 | 1/1972 | Leiber et al. | 303/105 |
| 3,937,525 | 2/1976 | Luhdorff et al. | 364/426 |
| 4,320,459 | 3/1982 | Lindemann et al. | 364/426 |
| 4,320,460 | 3/1982 | Brearley et al. | 364/426 |
| 4,349,876 | 9/1982 | Lindemann | 364/426 |
| 4,485,445 | 11/1984 | Braschel | 364/426 |
| 4,489,382 | 12/1984 | Jonner et al. | 364/426 |

Primary Examiner—Gary Chin
Attorney, Agent, or Firm—James B. Raden; Robert P. Seitter

[57] ABSTRACT

A method and device for controlling the variation of braking pressure in the wheel cylinders of brake-slip controlled vehicle brakes. The wheel rotational behavior ($v_{Rad}$) and further a vehicle reference velocity ($v_{Ref}$) are determined by sensors and logically combined to produce control signals. The braking pressure at the wheels is controllable by the operation of electromagnetically actuated valves (AV, EV) inserted in the pressure fluid circuit. A first pressure-decrease pulse is triggered as soon as the wheel velocity exceeds a deceleration or slip threshold during a braking action. The duration of the said pressure-decrease pulse is determined by the instantaneous deceleration upon attainment of the first switching threshold. Any subsequent pressure decrease pulse is delivered only after a predetermined waiting period and is of a duration determined by reference to the average acceleration.

5 Claims, 2 Drawing Sheets

METHOD AND DEVICE FOR CONTROLLING THE BRAKING VARIATION IN VEHICULAR BRAKES WITH BRAKE SLIP CONTROL

This application is a continuation of application Ser. No. 590,954, filed 3/19/84, now abandoned.

BACKGROUND OF THE INVENTION

The present invention relates to a method, provided in particular for road vehicles, for controlling the braking pressure variation in the wheel cylinders or vehicular brakes with brake slip control. The wheel rotational behaviour and the vehicle velocity, or a reference value representative of the vehicle velocity, are determined and logically combined to generate control signals by which the braking pressure at the wheels is controlled, individually and/or by groups. As soon as a tendency to lock is recognized, the braking pressure is decreased, maintained constant, or increased by the actuation of valves inserted in the pressure fluid circuit, in response to deceleration and/or slip thresholds. Devices for implementing this method are likewise the subject of the present invention.

As is commonly known, brake slip control apparatuses prevent the vehicle wheels from locking even in the event of heavy braking, in particular in the event of emergency or panic stops. Instead, the wheels continue to roll in a favourable slip range, with a view to preserving vehicle stability even under extreme conditions and rendering the stopping distance as short as possible. Brake slip control can be individually adjusted for each wheel, but for reasons of low-cost manufacture may be confined to sensing the wheel rotation and/or the pressure control of just some wheels. Or only certain parallel wheel groups, e.g. the wheels of the rear axle, may be slip controlled. It has been proposed to build up by delay, or to prematurely decrease, the wheel cylinder pressure at wheels not sensed, or not controlled, in dependence upon the pressure of the controlled wheels (German patent specification 26 27 284).

Many "control philosophies" and circuits are known for controlling braking pressure variation during a braking action based on the wheel's rotational behaviour, and for determining and processing the necessary measured values and for generating the control signals. But in methods and devices with continuous pressure modulation, or with invariable pressure control pulses, the system-inherent delay periods often have detrimental effects. Under bad conditions, e.g. on icy roads or wet surface aquaplaning, a pressure decrease initiated too late will not prevent quick locking of the wheel. In other cases, an excessive reduction of the braking pressure has to be immediately corrected by a rapid re-increase. However, marked variations in braking pressure during controlled braking impair driving stability, increase stopping distance, and reduce driving comfort.

German patent specification 19 14 765 described an electric control for an anti-locking brake system for a vehicle. When the wheel deceleration exceeds a predetermined magnitude, a pulse generator circuit feeds actuating signals to a solenoid valve assembly composed of inlet and outlet valves. The pulse generator circuit serves to stepwise decrease or build up the braking pressure. The ratio of (pulse length)/(pulse spacing) of the actuating signals is adapted to vary between 0 and infinity in response to the wheels' rotional behaviour. But such control behaviour critically depends upon how quickly the measured values for the control can be determined, processed, and corrected. It also depends on how fast they may take effect on the actual braking pressure distribution after having overcome the system-inherent dead times.

It is an object of the present invention to overcome these shortcomings by a braking method with slip control wherein the modulation of pressure fluid is comparatively small, reducing pressure variations in the individual wheel cylinders.

SUMMARY OF THE INVENTION

In the inventive braking method, upon attainment of a first switching threshold, a first pressure-decrease signal will be generated. The duration of this signal is dependent on the instantaneous wheel deceleration, preferably its value when the first switching threshold is reached. After termination of a predefined waiting period, a next pressure-decrease signal will be generated, its duration being determined by the difference between the instantaneous wheel velocities at the commencement and at the end of the previous waiting period.

Preferably, the pressure-decrease signal is a single pressure-decrease pulse. Alternatively, the signal may be a pulse train.

The inventive method makes the pressure-decrease pulses precisely conform to the needed pressure decrease. Both too great and too slight a pressure decrease are avoided.

Since adjustment of the pressure-decrease pulses is precise from the start, the energy demand of the brake slip control apparatus is considerably reduced in comparison with known systems with much greater pressure variations. This reduces the efforts required from the pressure accumulators, delivery pumps, etc. Owing to the sensitive pressure decrease, the wheels run smoothly during the controlled braking action, whereby reactions on the steering become comparatively slight. This facilitates countersteering in certain situations. This prevention of unnecessary high braking pressure variations extends the useful life of the brake system and wheel suspension. The smooth and safe breaking action will likewise improve driving comfort.

According to an embodiment of the present invention, the waiting period between two succeeding pressure-decrease pulses corresponds approximately to the system dead time. System dead time results substantially from sensor dead time, measurement time, control element reaction time, and time constants of the hydraulic unit and vehicle. Only upon termination of this waiting period will another pressure control pulse be allowed. If deceleration is still sensed after the waiting period, another pressure decrease is needed by at least one further pressure-decrease pulse.

Theoretically, the second pressure-decrease pulse duration (and, if necessary, all further pulses) could be calculated from instantaneous wheel deceleration like the first pulse. But in the present invention the pulses following the first pulse will be determined on the basis of a mean acceleration value over an interval. This is because the disturbances imposed on the signal are a decisive factor when determining the pulse duration. If it is considered that the wheel velocity is processed in any form from sensed velocity signals and therefore includes an error, the acceleration value derived from the differentiation of the measured velocity will likewise include an error. Consequently, instantaneous acceleration (or deceleration) will always be superimposed by a statistic error signal.

When the first pressure-decrease pulse is triggered, the then prevailing great accelerations or decelerations can be measured and recognized relatively precisely. Any error superimposed on the signal is minor relative to the information-containing signal. But later low-amplitude information-containing signals will be drowned by noises, because signal is low in comparison to noise or the disturbance level.

The first pressure-decrease pulse is always triggered by great wheel decelerations. Therefore, the determination of its duration, derived from the instantaneous wheel deceleration, is rather exact. However, for all further pressure-decrease pulses a more sensitive measuring method will be required. This is inventively accomplished by taking the mean acceleration using the velocity values at the commencement and at the end of the waiting periods. For this, the time interval between two successive pressure-decreasing pulses may be utilized as a waiting period and thus as a time basis. If this interval is constant, the two wheel velocity values, at the commencement and at the end of this interval, can be measured. The difference between these two values divided by the waiting period will then result in the average acceleration. Average acceleration is appropriate for the exact calculation of the duration of the next pressure-decrease pulse.

In inventive method:

A quick reaction is made to wheel deceleration in the critical range and the first pressure-decrease pulse is immediately triggered in response to the instantaneous wheel deceleration then prevailing.

A sensitive amount of pressure decrease is applied as a corrective in response to the first pressure-decrease pulse, taking into consideration the reaction of the wheel to the first pressure-decrease pulse. Afterwards, an average acceleration over an interval is used when calculating the second pressure-decrease pulse and all following ones, eliminating or reducing the effects of errors of measurement.

Further features, advantages and applications of the present invention will become obvious from the following description of further details of the invention by way of one embodiment.

DETAILED DESCRIPTION

Figure 1:
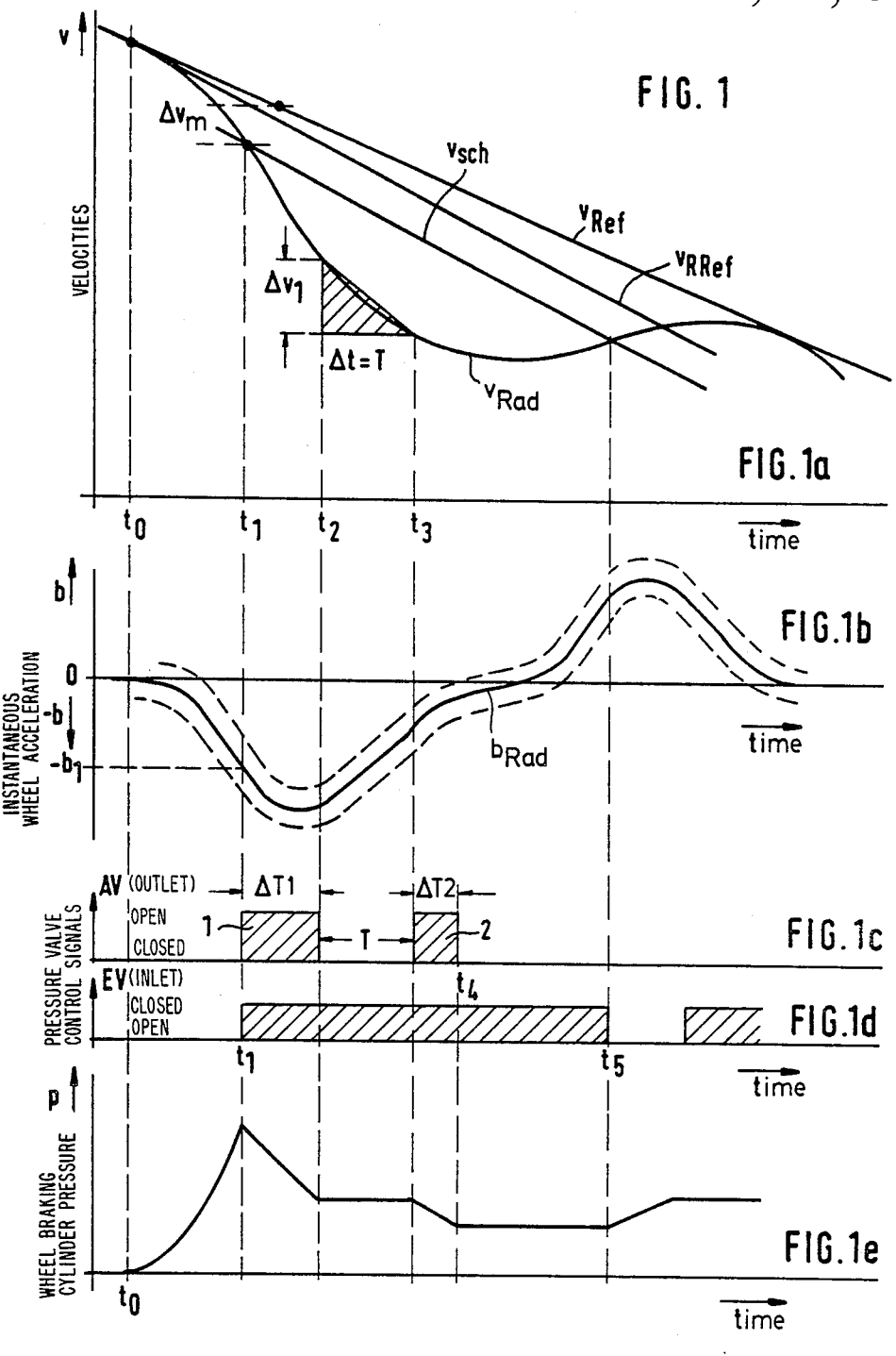
FIG. 1 shows graphed as a function of time the instantaneous wheel velocity $v_{Rad}$ and various reference velocities (FIG. 1a), instantaneous wheel acceleration $b_{Rad}$ (FIG. 1b), pressure control pulses to outlet (AV) and inlet (EV) pressure valves (FIG. 1c, 1d), as well as of the braking pressure in the wheel brake cylinder (FIG. 1e)

FIG. 1 shows the rotational behaviour of a vehicle wheel in the first phase of a controlled braking action. A corresponding characteristic curve will ensue for all other individually controlled vehicle wheels.

In FIG. 1, the upper graph FIG. 1a shows the instantaneous wheel velocity designated by $v_{Rad}$. A reference value $v_{Ref}$ represents the vehicle velocity, or a reference value representative of the vehicle velocity. For example, the vehicle velocity $v_{Ref}$ may be determined from velocity measurements at all wheels, by appropriate combination of the measured values. Or vehicle velocity can be directly measured with the aid of radar or the like.

A wheel reference value $v_{RRef}$ is calculated in addition to the vehicle velocity $v_{Ref}$. $v_{RRef}$ represents a straight line with the slope $-1g$, tangent to the wheel velocity curve $v_{Rad}$ at time $t_o$. This line curve $v_{RRef}$ represents the theoretical course of velocity at a wheel deceleration of $-1g$, namely the theoretically maximum possible deceleration. It is therefore particularly apt as a reference value.

Extending in parallel to $v_{RRef}$ is the calculated straight line $v_{sch}$ which is relevant for the switching threshold. A pressure-decrease pulse will be triggered only if the deviation of the instantaneous wheel velocity $v_{Rad}$ from the straight line $v_{RRef}$ reaches or exceeds a predetermined minimum value $\Delta v_m$. This prevents the pressure-decrease valve from responsing to mere signal disturbances or signals triggered by uneven road conditions, etc.

The first pressure-decrease pulse will be applied to an electromagnetically actuated outlet switch value AV (not shown). This occurs during breaking as soon as the wheel velocity curve $v_{Rad}$ departs from the reference value $v_{RRef}$ enough to intersect the curve line $v_{sch}$. In graph 1a, this occurs at time $t_1$. Energizing the switch value enables the discharge of pressure fluid into a pressure compensating reservoir in a known fashion. The pressure medium is introduced via an electromagnetically actuated inlet valve EV, that is open when de-energized. The braking pressure is decreased with the aid of a solenoid outlet valve AV, that is closed when de-energized. The control signals for these valves are illustrated in FIGS. 1c and 1d, in which the 0 line indicates the de-energized state. Conventional solenoid valve assemblies are used in this arrangement, so closer explanations may be dispensed with.

The duration $\Delta T1$ of the first braking pressure-decrease pulse 1, is the time interval between $t_1$ and $t_2$ in FIG. 1c. During this interval the outlet valve AV is opened. Referring to FIG. 1b, its duration is determined by the instantaneous deceleration $-b_1$ at time acceleration $b_{Rad}$ from the velocity curve of FIG. 1a. Advantageously, the brake system is such that, with the braking conditions constant, the braking pressure will be decreased by the first pressure-decrease pulse 1 according to FIG. 1c so far that the wheel is just about able to re-accelerate. As soon as the braking conditions and/or the influences on the controlled wheel change, e.g. due to the dynamic and static axle load shifting, due to vibrations in the wheel suspension, by variation of the brake temperature, variations in the friction value etc., the first decrease pulse 1 will not yet suffice, for which reason a further correction will take place by means of the second decrease pulse 2 and further pulses, if necessary.

The waiting period T between the first pressure-decrease pulse 1 and the second pressure-decrease pulse 2, compare FIG. 1c, is dimensioned in consideration of the total dead time of the brake system. The wheel rotational behaviour at time $t_3$, i.e. upon termination of the waiting period, already shows a significant reaction of the wheel in response to the first pressure-decrease pulse. Now the further pressure-decrease requirement should be precisely assessed and the optimum braking pressure adjusted for by precise determination of the duration of the pulse 2. After the second pressure-decrease pulse 2, if will rarely happen that a further pressure-build-up pulse or another pressure-decrease pulse will be necessary.

In contrast to the first pulse 1, the second pulse and the possibly required further pressure-decrease pulses 2 are determined by means wheel acceleration values. Thus, the effect of the inevitable statistic errors of measurement can be reduced to a minimum. This is particularly important since the signals for the determination of the pulses at time $t_3$ or later are low in comparison to the signal measured at the point of time $t_1$. In FIG. 1b, the error range of the instantaneous wheel acceleration curve is illustrated by the dotted lines in parallel to the acceleration curve.

At the point of time $t_1$ at the latest, i.e. at the commencement of the pressure-decrease pulse 1, the pressure inlet valve EV will be excited (closed) for a longer time interval, as is shown in FIG. 1d. A new braking pressure build-up will not be initiated until time $t_5$, at which the reacceleration $b_{Rad}$ of the wheel exceeds a critical threshold value. FIG. 1e shows in a schematically simplified manner the resulting braking pressure variation at the wheel brake cylinder of the wheel whose velocity curve is $v_{Rad}$ in FIG. 1a.

Figure 2:
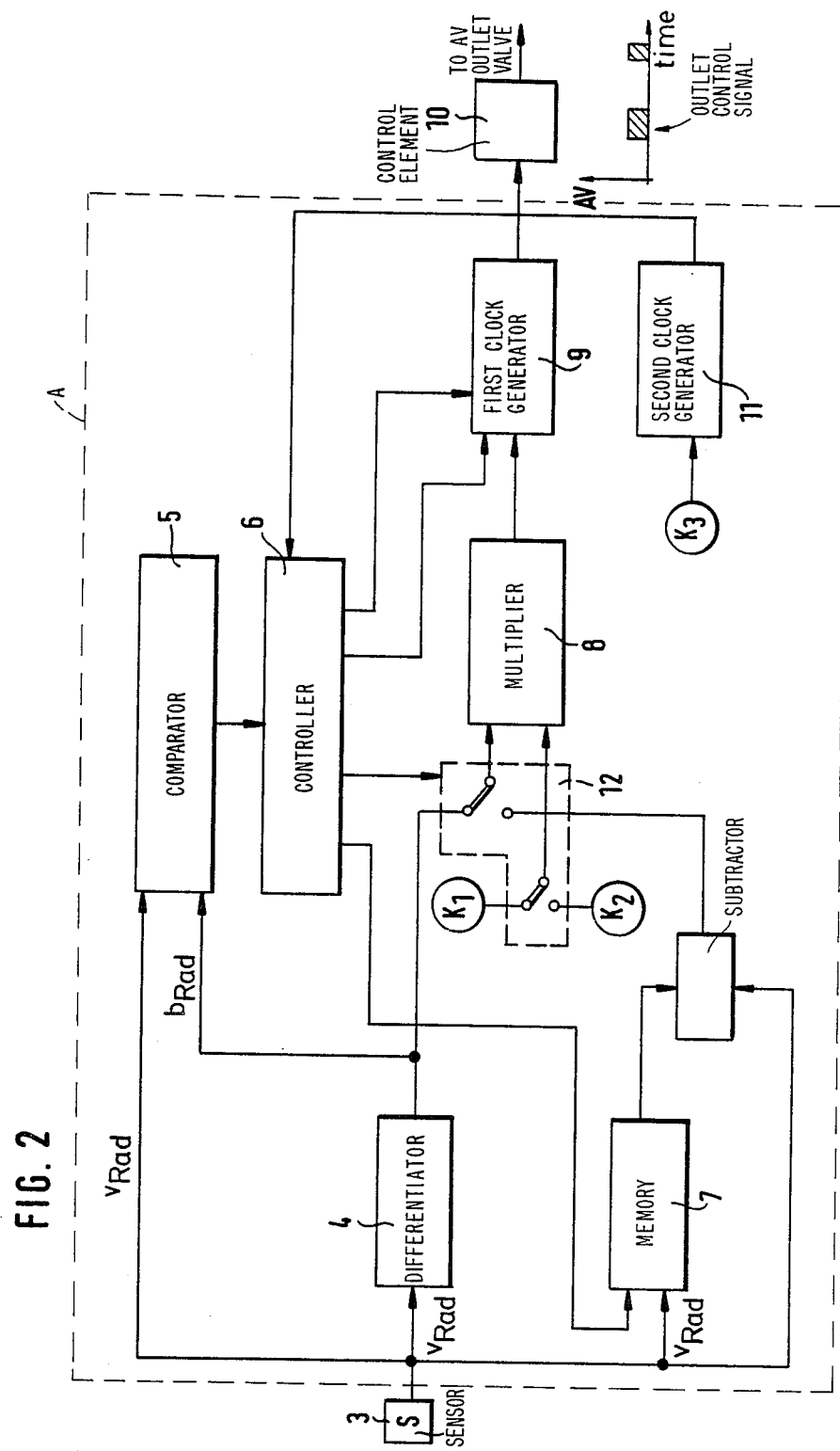
FIG. 2 shows a block diagram of an embodiment of a switching arrangement for implementing the method according to the invention.

The switching arrangement according to FIG. 2 serves to realise the method described. It triggers pressure-decrease pulses in the aforementioned manner. Only those parts of the arrangement required to determine and to process the control signals of the pressure-decrease valve AV of a control channel or of a wheel are shown.

As shown in FIG. 2, a wheel velocity sensor 3 measures the instantaneous velocity $v_{Rad}$ of the wheel and supplies it to a differentiator 4 which forms the wheel acceleration signals $b_{Rad}$. Said acceleration and velocity signals go to a comparator 5 to be compared with predetermined acceleration and deceleration thresholds. The comparison results are supplied to a controller 6. Controller 6 provides output signals to a memory 7, a multiplier 8 and a first clock generator 9. The output of a second clock generator 11 is provided as a second input to controller or control block 6. In a known manner, and as is described more fully hereinafter, control block 6 functions to control the various devices to which its outputs are coupled and in response to a second clock generator 11. That is, control block 6 includes well known circuits which perform the following functions. When the conditions for decrease of braking pressure are fulfilled, the instantaneous velocity value $v_{Rad}$ is stored in memory 7. Furthermore, the instantaneous acceleration signal $b_{Rad}$ formed in the differentiator 4 is multiplied by a system-inherent proportionality factor $K_1$ in a multiplier 8 whose product is supplied as an indication of an interval $\Delta T1$ to a first clock generator 9. The clock generator 9, started by control block 6, delivers its output signal of duration T1 to a control element 10 which energizes (opens) outlet valve AV (not shown in FIG. 2) for time $\Delta T1$.

Upon termination of the time interval $\Delta T1$ preset by the first clock generator 9, the negative slope of the clock output signal causes start-up of a second clock generator 11. The second clock generator defines a constant waiting period time interval T, as is indicated by the constant $K_3$. When the action of the second clock generator is terminated, this is signalled to the control block 6. The difference $\Delta V1$ between present and previously stored instantaneous wheel velocity $v_{Rad}$, that is to say the difference between the instantaneous velocity prevailing at the commencement ($t_2$) and at the end ($t_3$) of the waiting period T, will be supplied as an indication of duration $\Delta T2$ to the multiplier 8 through a switch 12. The difference is determined beforehand in the subtractor 13, whose input is both connected to the output of the memory 7 and furnished with the instantaneous velocity by the sensor 3.

Subsequently, the first clock generator 9 will be set and started anew by the control block 6. The variable pulse generated thereby will be supplied to the control element 10 again, thus causing energization of the pressure-decrease valve AV for the time $\Delta T2$ determined in the logic circuit.

The electronic logic circuit shown in FIG. 2 features only one of several alternatives for the generation of the signals and the control of the solenoid valves AV, EV. Instead of a hard-wired logic, likewise a programmed electronic circuitry, e.g. a microcontroller A, may be utilized. This does not alter the characteristic features of the inventive method and the advantages accomplished by this method. In such a case, the velocity values determined with the aid of the individual wheel sensors are supplied in parallel to the microcontroller, processed therein, and finally delivered to limit switches which take effect directly on the individual solenoid valves at the inlet and the outlet of the pressure fluid medium for the controlled wheel. Also in this arrangement, formation of the first and the further pressure-decrease pulses will be effected according to the interrelationship previously described by way of FIGS. 1a and 1b.

What is claimed is:

1. A device for controlling the braking pressure variation in an automotive vehicle having vehicle wheels with wheel brakes connected to a pressure source by way of pressure fluid lines and which vehicle includes slip control, said device comprising, in combination:

a plurality of electromagnetically operated control valves respectively connected in pressure fluid lines leading to the wheel brakes;

a control element having an output connected to said control valves and having an input responsive to control signals for reducing the pressure applied to said wheel brakes by said pressure fluid lines;

a sensor coupled to at least one of said vehicle wheels for providing a first output signal indicative of the rotational velocity of at least one vehicle wheel;

means coupled to said sensor for providing a second output signal indicative of the instantaneous velocity of said one vehicle wheel when the deceleration of said one vehicle wheel exceeds a predetermined value and wherein the duration of said second output signal is proportional to the value of said deceleration;

means for applying said second output signal to said input of said control element to reduce the pressure applied to said wheel brakes during said duration of said second output signal;

means responsive to the cessation of said second output signal and being coupled to said input of said control element for substantially maintaining the pressure applied to said wheel brakes for a predetermined waiting period;

means coupled to said sensor for providing a third output signal indicative of the difference between the instantaneous velocities of said one vehicle wheel at the temporal start point and the temporal end point of said waiting period;

means for determining the temporal end point of said waiting period and for providing a fourth output signal indicative thereof;

means responsive to said third and fourth output signals for providing a fifth output signal whose duration is proportional to said difference between said instantaneous velocities of said one wheel; and means for applying said fifth output signal to said input of said control element to reduce the pressure applied to said wheel brakes during said duration of said fifth output signal.

2. The device according to claim 1, including means operatively coupled to said means coupled to said sensor for providing a third output signal for dividing said difference between said instantaneous velocities by the time period of said predetermined waiting period wherein said third output signal is indicative of the average acceleration of said one vehicle wheel.

3. The device according to claim 1, wherein said second signal is provided as a train of successive pulses.

4. A method for controlling the braking pressure variation in an automotive vehicle having vehicle wheels with wheel brakes connected to a pressure source by way of pressure fluid lines and which vehicle includes slip control, said method comprising the steps of:

providing a plurality of electromagnetically operated control valves respectively connected in pressure fluid lines leading to the wheel brakes;

providing a control element having an output connected to said control valves and having an input responsive to control signals for reducing the pressure applied to said wheel brakes by said pressure fluid lines;

providing a first output signal indicative of the rotational velocity of at least one vehicle wheel;

providing a second output signal indicative of the instantaneous velocity of said one vehicle wheel when the deceleration of said one vehicle wheel exceeds a predetermined value and wherein the duration of said second output signal is proportional to the value of said deceleration;

applying said second output signal to said input of said control element to reduce the pressure applied to said wheel brakes during said duration of said second output signal;

upon the cessation of said second output signal substantially maintaining the pressure applied to said wheel brakes for a predetermined waiting period;

providing a third output signal indicative of the difference between the instantaneous velocities of said one vehicle wheel at the temporal start point and the temporal end point of said waiting period;

determining the temporal end point of said waiting period and providing a fourth output signal indicative thereof;

providing a fifth output signal responsive to said third and fourth output signals and whose duration is proportional to said difference between said instantaneous velocities of said one wheel; and applying said fifth output signal to said input of said control element to reduce the pressure applied to said wheel brakes during said duration of said fifth output signal.

5. The method according to claim 4, wherein the step of providing a third output signal includes the step of dividing said difference between said instantaneous velocities by the time period of said predetermined waiting period wherein said third output signal is indicative of the average acceleration of said one vehicle wheel.

* * * * *